(12) United States Patent
Morgan

(10) Patent No.: US 11,414,119 B1
(45) Date of Patent: Aug. 16, 2022

(54) ELECTRIC STROLLER

(71) Applicant: Ishmael Morgan, Bronx, NY (US)

(72) Inventor: Ishmael Morgan, Bronx, NY (US)

(\*) Notice: Subject to any disclaimer, the term of this patent is extended or adjusted under 35 U.S.C. 154(b) by 506 days.

(21) Appl. No.: 16/589,215

(22) Filed: Oct. 1, 2019

(51) Int. Cl.
| | |
|---|---|
| *B62B 5/00* | (2006.01) |
| *B60K 1/04* | (2019.01) |
| *B60K 17/14* | (2006.01) |
| *B60K 1/02* | (2006.01) |
| *B60L 15/20* | (2006.01) |
| *B60K 26/02* | (2006.01) |
| *B62B 7/04* | (2006.01) |
| *B62B 9/20* | (2006.01) |
| *B62B 9/26* | (2006.01) |
| *B62B 9/14* | (2006.01) |
| *B62B 9/10* | (2006.01) |
| *B62J 1/08* | (2006.01) |
| B60B 33/00 | (2006.01) |
| B62K 5/00 | (2013.01) |

(52) U.S. Cl.
CPC .............. *B62B 5/0043* (2013.01); *B60K 1/02* (2013.01); *B60K 1/04* (2013.01); *B60K 17/145* (2013.01); *B60K 26/02* (2013.01); *B60L 15/20* (2013.01); *B62B 5/0053* (2013.01); *B62B 5/0069* (2013.01); *B62B 7/04* (2013.01); *B62B 9/102* (2013.01); *B62B 9/142* (2013.01); *B62B 9/20* (2013.01); *B62B 9/26* (2013.01); *B62J 1/08* (2013.01); *B60B 33/00* (2013.01); *B60K 2001/0422* (2013.01); *B60K 2026/025* (2013.01); *B62J 2001/085* (2013.01); *B62K 5/00* (2013.01)

(58) Field of Classification Search
CPC .......... B62B 5/0043; B60K 1/02; B60K 1/04; B60K 17/145
See application file for complete search history.

(56) References Cited

U.S. PATENT DOCUMENTS

| | | | | |
|---|---|---|---|---|
| 1,661,257 | A | 3/1928 | Kirch | |
| 3,955,639 | A * | 5/1976 | Cragg | A61G 5/0816 180/907 |
| 4,629,950 | A * | 12/1986 | Ching | H02P 7/05 318/285 |
| 4,770,431 | A | 9/1988 | Kulik | |
| 5,291,959 | A * | 3/1994 | Malblanc | A61G 5/1083 180/11 |
| 5,873,425 | A * | 2/1999 | Yang | B62B 9/00 180/65.6 |
| 6,148,942 | A * | 11/2000 | Mackert, Sr. | B62B 9/08 192/17 R |
| 6,360,836 | B1 | 3/2002 | Milano | |

(Continued)

*Primary Examiner* — Tony H Winner
*Assistant Examiner* — Michael R Stabley
(74) *Attorney, Agent, or Firm* — Kyle A. Fletcher, Esq.

(57) ABSTRACT

The electric stroller comprises a frame, a child seat, an operator seat, a plurality of wheels, a port motor, a starboard motor, a control circuit, and a battery. The electric stroller may be a self-propelled conveyance. The child seat may be supported by the frame and may be adapted to transport a child. The operator seat may be coupled to the frame behind the child seat and may be adapted to transport an operator. A port driven wheel may be propelled by the port motor and a starboard driven wheel may be propelled by the starboard motor with the speed and direction of the port motor and the starboard motor controlled independently.

19 Claims, 4 Drawing Sheets

(56) References Cited

U.S. PATENT DOCUMENTS

| | | | |
|---|---|---|---|
| 6,443,252 B1 * | 9/2002 | Andes | A61G 5/1089 |
| | | | 280/32.7 |
| 7,004,272 B1 | 2/2006 | Brown | |
| 7,249,779 B2 | 7/2007 | Ehrenreich | |
| 7,987,933 B1 * | 8/2011 | McClellan | B62B 9/00 |
| | | | 280/647 |
| 8,029,007 B2 | 10/2011 | Jones | |
| 8,322,740 B1 | 12/2012 | Visconti | |
| 9,150,271 B1 | 10/2015 | Liu | |
| 9,669,858 B2 * | 6/2017 | Washington | B62B 9/005 |
| 9,744,095 B1 * | 8/2017 | Mazzei | B62K 27/12 |
| 9,796,401 B1 * | 10/2017 | Ammirati | B62B 5/0046 |
| 10,913,479 B1 * | 2/2021 | Cardentey | B62B 7/042 |
| 2007/0114738 A1 * | 5/2007 | Jones | B62B 5/087 |
| | | | 280/32.7 |

* cited by examiner

ELECTRIC STROLLER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of child transportation, more specifically, an electric stroller.

SUMMARY OF INVENTION

The electric stroller comprises a frame, a child seat, an operator seat, a plurality of wheels, a port motor, a starboard motor, a control circuit, and a battery. The electric stroller may be a self-propelled conveyance. The child seat may be supported by the frame and may be adapted to transport a child. The operator seat may be coupled to the frame behind the child seat and may be adapted to transport an operator. A port driven wheel may be propelled by the port motor and a starboard driven wheel may be propelled by the starboard motor with the speed and direction of the port motor and the starboard motor controlled An object of the invention is to transport a child.

Another object of the invention is to transport an operator.

A further object of the invention is to propel the stroller using a pair of motors.

Yet another object of the invention is to hinge the operator seat such that the operator may stand of sit on the stroller.

These together with additional objects, features and advantages of the electric stroller will be readily apparent to those of ordinary skill in the art upon reading the following detailed description of the presently preferred, but nonetheless illustrative, embodiments when taken in conjunction with the accompanying drawings.

In this respect, before explaining the current embodiments of the electric stroller in detail, it is to be understood that the electric stroller is not limited in its applications to the details of construction and arrangements of the components set forth in the following description or illustration. Those skilled in the art will appreciate that the concept of this disclosure may be readily utilized as a basis for the design of other structures, methods, and systems for carrying out the It is therefore important that the claims be regarded as including such equivalent construction insofar as they do not depart from the spirit and scope of the electric stroller. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a bottom view of an embodiment of the

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
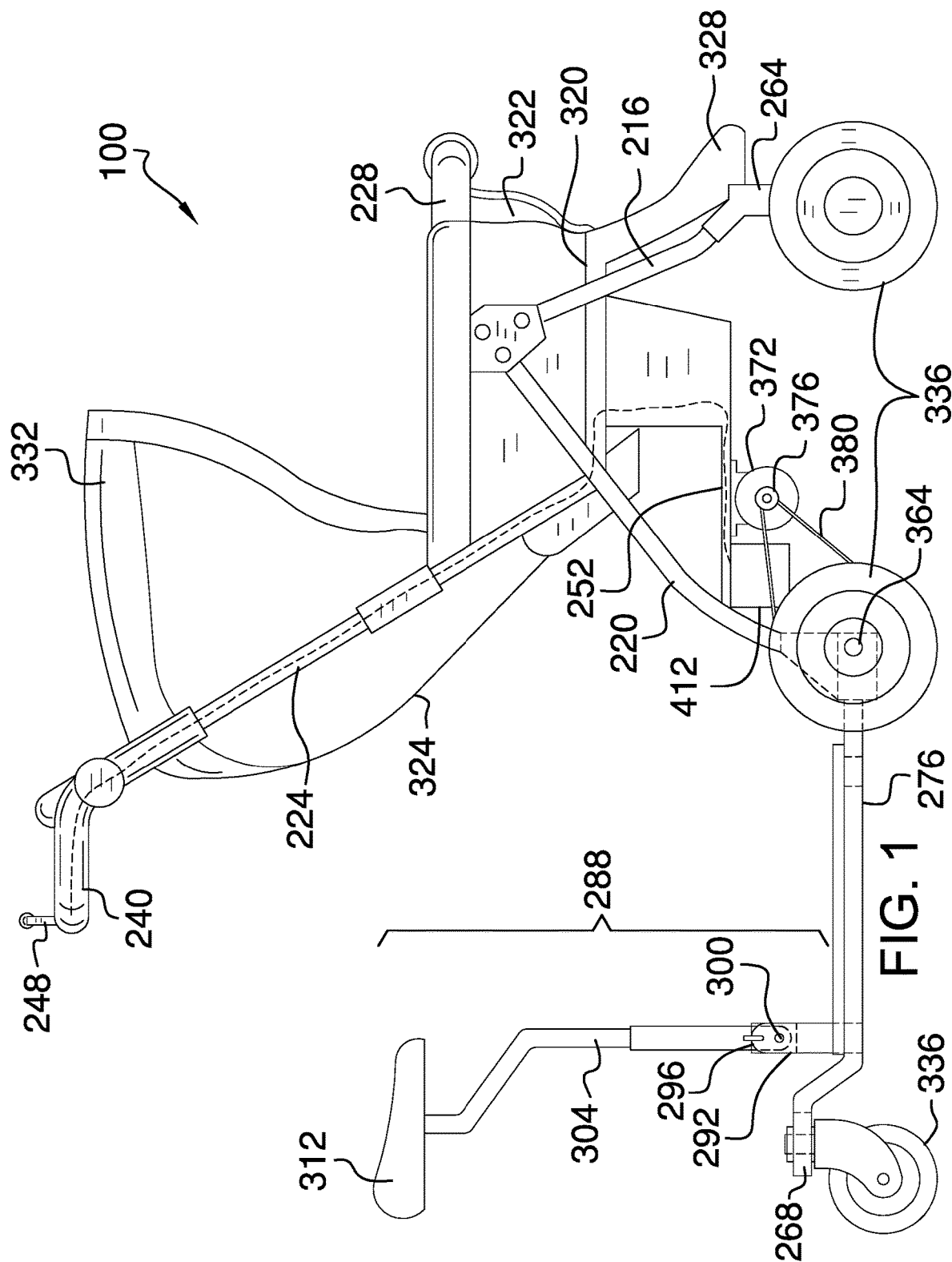
FIG. 1 is a starboard side view of an embodiment of the disclosure.
Figure 2:
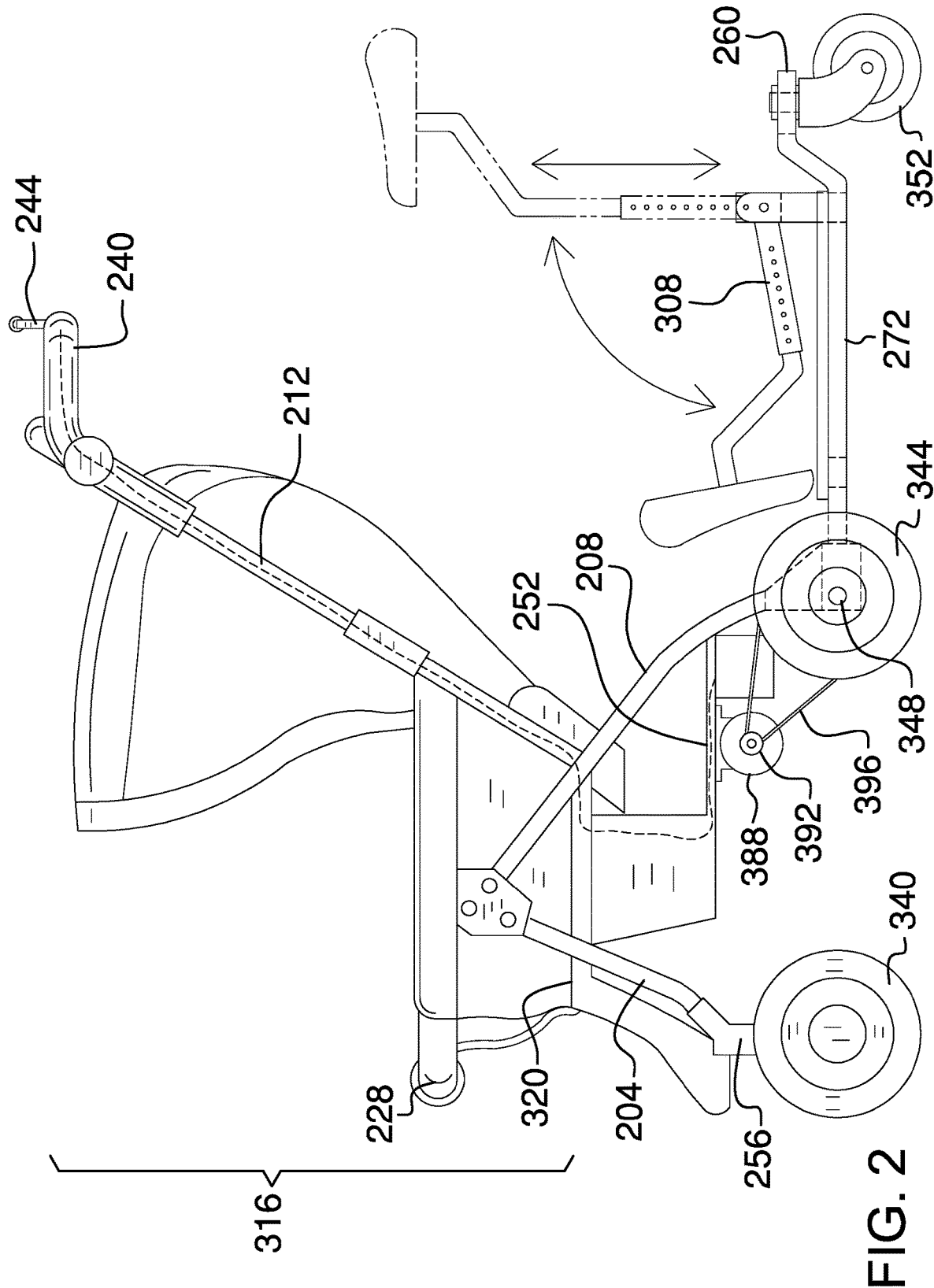
FIG. 2 is a port side view of an embodiment of the disclosure.
Figure 3:
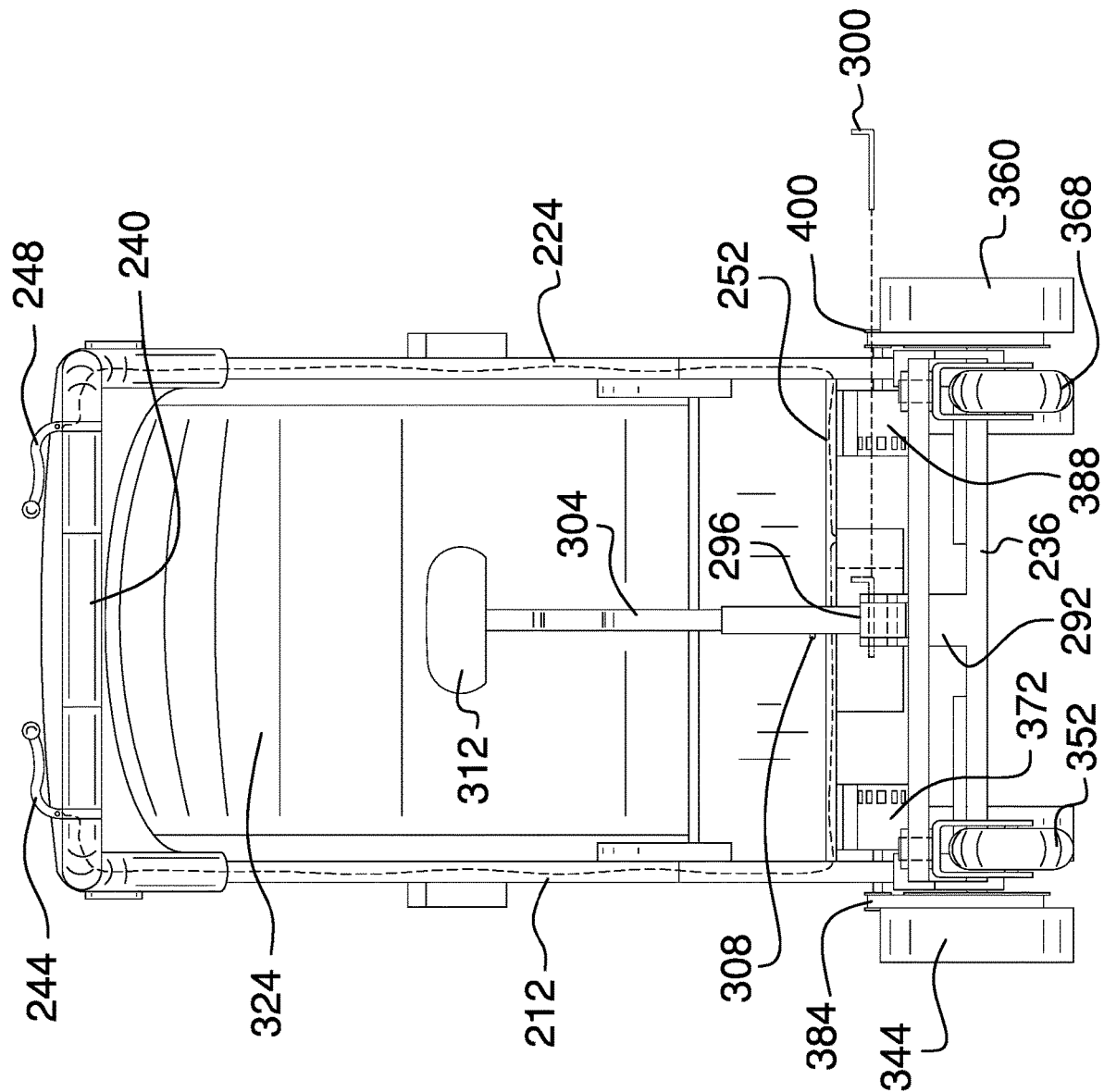
FIG. 3 is a rear view of an embodiment of the disclosure.
Figure 4:
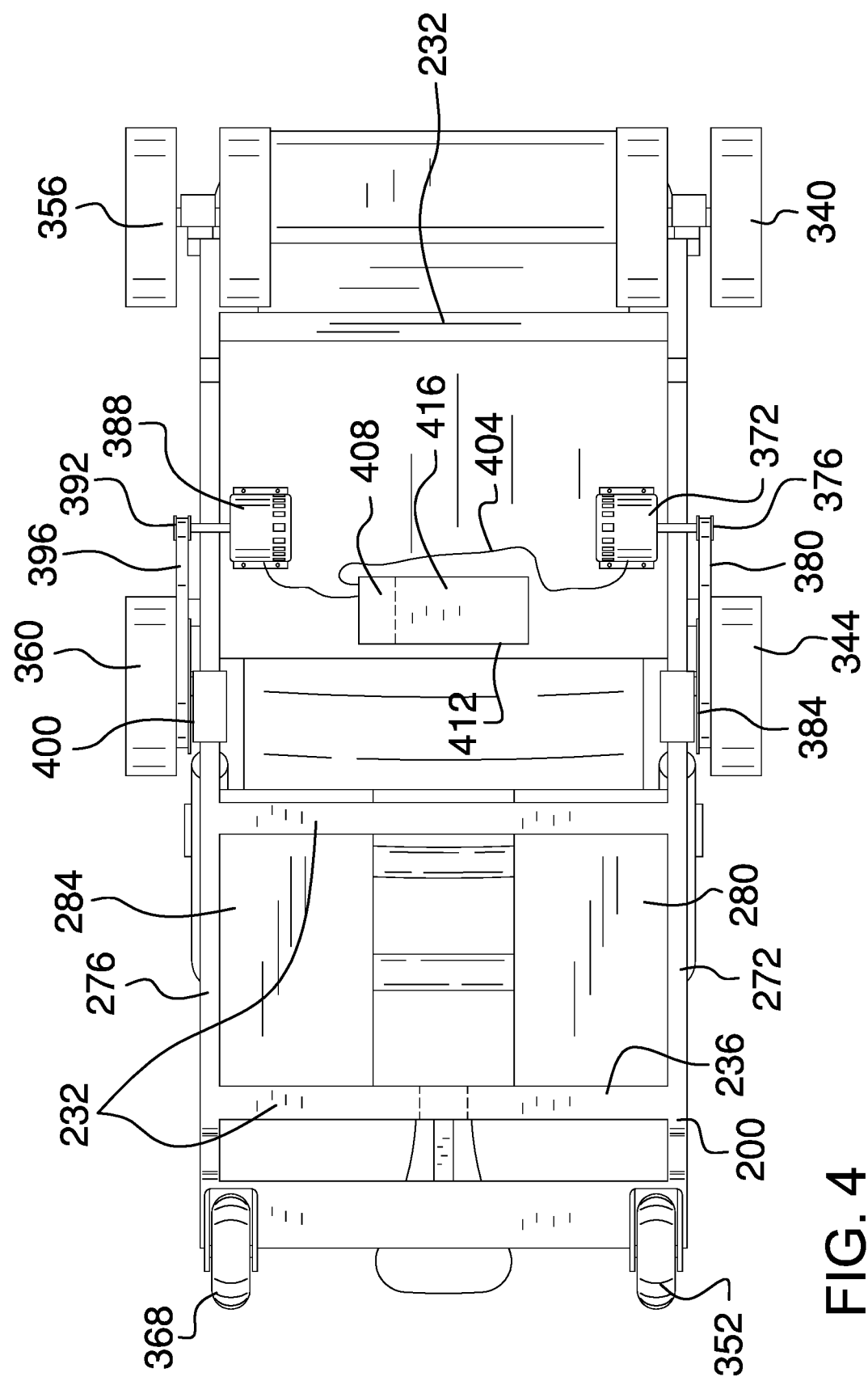

Detailed reference will now be made to a first potential embodiment of the disclosure, which is illustrated in FIGS. 1 through 4.

The electric stroller 100 (hereinafter invention) comprises a frame 200, a child seat 316, an operator seat 288, a plurality of wheels 336, a port motor 372, a starboard motor 388, a control circuit 408, and a battery 416. The invention 100 may supported by the frame 200 and may be adapted to transport a child. The operator seat 288 may be coupled to the frame 200 behind the child seat 316 and may be adapted to transport an operator. A port driven wheel 344 may be propelled by the port motor 372 and a starboard driven wheel 360 may be propelled by the starboard motor 388 with the speed and direction of the port motor 372 and the starboard motor 388 controlled independently.

The frame 200 may provide mechanical support for at least the child seat 316, the operator seat 288, the plurality of wheels 336, the port motor 372, the starboard motor 388, the control circuit 408, and the battery 416. The frame 200 may comprise a port front leg 204, a port rear leg 208, a port upright 212, a starboard front leg 216, a starboard rear leg 220, a starboard upright 224, a child seat support 228, a plurality of crossbars 232, a handlebar 240, a cargo shelf 252, a port front wheel mount 256, a port rear wheel mount 260, a starboard front wheel mount 264, a starboard rear wheel mount 268, a port rear extension 272, a starboard rear extension 276, a port foot board 280, and a starboard foot board 284.

The port side of the frame 200 may be vertically oriented and may comprise the port front leg 204, the port rear leg 208, and the port upright 212. The top of the port front leg 204 may be coupled to the top of the port rear leg 208 and to a midpoint support 228. The bottom of the port front leg 204 may be coupled to the port front wheel mount 256. The bottom of the port rear leg 208 may be coupled to the front of the port rear extension 272. The bottom of the port upright 212 may be coupled to a midpoint of the port rear leg 208. The top of the port upright 212 may extend upwards and rearwards and may be coupled to the port side of the handlebar 240. The port upright 212 may extend forward horizontally and may provide support for the port side of a seat bottom 320. The port rear extension 272 may be a horizontally oriented armature that extends rearwards from the port rear leg 208. The port rear wheel mount 260 may be located at the rear of the port rear extension 272. In some embodiments, the port rear wheel mount 260 may be an aperture having a vertical central axis.

The starboard side of the frame 200 may be vertically oriented and may comprise the starboard front leg 216, the starboard rear leg 220, and the starboard upright 224. The top of the starboard front leg 216 may be coupled to the top of the starboard rear leg 220 and to a midpoint of the child seat support 228 on the starboard of the child seat support 228. The bottom of the starboard front leg 216 may be coupled to the starboard front wheel mount 264. The bottom of the starboard rear leg 220 may be coupled to the front of the starboard rear leg coupled to a midpoint of the starboard rear leg 220. The top of the starboard upright 224 may extend upwards and rearwards and may be coupled to the starboard side of the handlebar 240. The starboard upright 224 may extend forward horizontally and may provide support for the starboard side of the seat bottom 320. The starboard rear extension 276 may be a horizontally oriented armature that extends rearwards from the starboard rear leg 220. The starboard rear wheel mount 268 may be located at the rear of the starboard rear extension 276. In some embodiments, the starboard rear wheel mount 268 may be an aperture having a vertical central axis.

The handlebar 240 may be an armature that is adapted to be grasped by the operator. The handlebar 240 may be coupled between the top of the port upright 212 and the top of the starboard upright 224.

The child seat support 228 may be a U-shaped armature that supports the top of the seat bottom 320. The child seat support 228 may be horizontally oriented and may extend forward from a midpoint of the port upright 212 and a midpoint of the starboard upright 224.

The plurality of crossbars 232 may be horizontally oriented armatures that may couple laterally between the port front leg 204 and the starboard front leg 216, between the port rear leg extension 272 and the starboard rear extension 276, or combinations thereof. A seat base 292 may be coupled to the center of a seat support crossbar 236 selected from the plurality of crossbars 232.

The handlebar 240 may comprise a port motor controller 244 and a starboard motor controller 248. The port motor controller 244 may control the rotational speed and direction of rotation of the port motor 372. Specifically, the port motor controller 244 may be adapted to be twisted by the operator. The direction of the twist may determine the direction of rotation of the port motor 372. The angular distance subtended by the twist may determine the rotational speed of the port motor 372. Both the direction and the angle of the twist may be measured from a neutral center point of the port motor controller 244. The starboard motor controller 248 may control the rotational speed and direction of rotation of the starboard motor 388.

Specifically, the starboard motor controller 248 may be adapted to be twisted by the operator. The direction of the twist may determine the direction of rotation of the starboard motor 388. The angular distance subtended by the twist may determine the rotational speed of the starboard motor 388. Both the direction and the angle of the twist may be measured from a neutral center The cargo shelf 252 may be a storage platform located under the child seat 316. The cargo shelf 252 may be a horizontally oriented planar surface that is coupled to the frame 200. The port foot board 280 may be a horizontally oriented surface adapted to support a left foot of the operator. The port foot board 280 may be coupled to the plurality of crossbars 232 and to the port rear extension 272. The starboard foot board 284 may be a horizontally oriented surface adapted to support a right foot of the operator. The starboard foot board 284 may be coupled to the plurality of crossbars 232 and to the starboard rear extension 276.

The child seat 316 may be adapted to be a seating area for the child. The child seat 316 may comprise the seat bottom 320, a seat back 324, a foot rest 328, and a sun shade 332. The seat bottom 320 may be a flexible panel that may be suspended from the child seat support 228. The seat bottom 320 may comprise a horizontal surface adapted for the child to sit upon. The seat bottom 320 may comprise a pair of leg holes 322 at the front of the child seat 316. The seat back 324 may be a flexible back support. The seat back 324 may be supported by the port upright 212 and by the starboard upright 224. The foot rest 328 may be a ledge that descends at the front of the child seat 316. The foot sun shade 332 may be a flexible sun barrier that may pivot forward to block exposure to the sun.

The operator seat 288 may be adapted to provide a seating area for the operator. The operator seat 288 may comprise the seat base 292, a seat hinge 296, a seat riser 304, and a saddle seat 312. The operator seat 288 may pivot forward for standing operation. The seat base 292 may be a vertically oriented armature that extends upwards from the seat support crossbar 236. The top of the seat base 292 may be coupled to the seat hinge 296. The seat hinge 296 may be a pivot point between the seat base 292 and the seat riser 304. When a hinge release 300 is unlocked, the seat riser 304 may pivot forward at the seat hinge 296. When the hinge release 300 is locked, the seat riser 304 may be fixed in an upright orientation. In some embodiments, the hinge release 300 may be a removable pin. The seat riser 304 may be a vertically oriented armature that couples to the seat hinge 296 at the bottom of the seat riser 304 and to the saddle seat 312 at the top of the seat riser 304. The height of the seat riser 304 may be adjustable. The seat riser 304 may be telescoping and may be extended or retracted when a height lock 308 is unlocked. When the height lock 308 is locked, the height of the seat riser 304 may be fixed. The saddle seat 312 may be coupled to the top of the seat riser 304. The saddle seat 312 may be adapted for the operator to sit upon.

The plurality of wheels 336 may reduce friction between the invention 100 and the ground and may propel the invention 100. The plurality of wheels 336 may comprise a port front caster 340, the port driven wheel 344, a port rear caster 352, a starboard front caster 356, the starboard driven wheel 360, and a starboard rear caster 368.

The port front caster 340 may be pivotably coupled to the port front wheel mount 256. The starboard front caster 356 may be pivotably coupled to the starboard front wheel mount 264. The port rear caster 352 may be pivotably coupled to the port rear wheel mount 260. The starboard rear caster 368 may be pivotably coupled to the starboard rear wheel mount 268.

The port driven wheel 344 may be pivotably coupled to a port axle 348. The port axle 348 may be coupled to the port side of the frame 200 at the bottom end of the port rear leg 208. A port wheel pulley 384 may be coupled to the inside of the port driven wheel 344. A port motor pulley 376 may be coupled to the shaft of the port motor 372. The port wheel pulley 384 and the port motor pulley 376 may be aligned such that a port wheel belt 380 may loop around the port motor pulley 376 and the port wheel pulley 384. Rotation of the port motor pulley 376 by the port motor 372 may drive the port wheel pulley 384 and the port driven wheel 344. The starboard driven wheel 360 may be pivotably coupled to a starboard axle 364. The starboard axle 364 may be coupled to the starboard side of the frame 200 at the bottom end of the starboard rear leg 220. A starboard wheel pulley 400 may be coupled to the inside of the starboard driven wheel 360. A starboard motor pulley 392 may be coupled to the shaft of the starboard motor 388. The starboard wheel pulley 400 and the starboard motor pulley 392 may be aligned such that a starboard wheel belt 396 may loop around the starboard motor pulley 392 and the starboard wheel pulley 400. Rotation of the starboard motor pulley 392 by the starboard motor 388 may drive the starboard wheel pulley 400 and the starboard driven wheel 360.

Those skilled in the art will recognize that other mechanisms may be used to drive the port driven wheel 344 and the starboard driven wheel 360. As non-limiting examples, the port wheel pulley 384, the starboard wheel pulley 400, the port motor pulley 376, and the starboard motor pulley 392 may be gears instead of pulleys and the port wheel belt 380 and the starboard wheel belt 396 may be chains instead of belts.

The port motor 372 may convert electrical energy into mechanical energy. The port motor 372 may cause rotation of the port motor pulley 376 when electrical energy is applied to the port motor 372. The electrical energy applied to the port motor 372 may be controlled by the control circuit 408. The starboard motor 388 may convert electrical energy into mechanical energy.

The starboard motor 388 may cause rotation of the starboard motor pulley 392 when electrical energy is applied to the starboard motor 388. The electrical energy applied to the starboard motor 388 may be controlled by the control circuit 408.

The control circuit 408 may control the rotational direction and speed of the port motor 372 and the starboard motor 388. The control circuit 408 may be electrically coupled to the port motor controller 244, the starboard motor controller 248, the port motor 372, the starboard motor 388, and the battery 416 via wiring 404. The control circuit 408 may accept electrical inputs from the port motor controller 244 and from the starboard motor controller 248 representing the positions of the port motor controller 244 and the starboard motor controller 248. The control circuit 408 may send electrical outputs to the port motor 372 and to the starboard motor 388 to establish a rotational speed and direction for each motor. The control circuit 408 and the battery 416 may be housed in a controller compartment 412 that is coupled to the underside of the cargo shelf 252.

The battery 416 may comprise one or more energy-storage devices. The battery 416 may be a source of electrical energy to operate the port motor 372 and the starboard motor 388. The battery 416 may be replaceable or rechargeable.

In use, the child may be seated in the child seat 316 with the child's legs protruding through the pair of leg holes 322 and the child's back against the seat back 324. The operator seat 288 may be pivoted into an upright position by lifting the seat riser 304 up and locking the hinge release 300. The operator may sit on the saddle seat 312 with the left foot on the port foot board 280 and the right foot on the starboard foot board 284. The operator may move the invention 100 forward or backwards and may select the speed by twisting the port motor controller 244 and the starboard motor controller 248 in unison. The operator may cause the invention 100 to turn by twisting the port motor controller 244 and the starboard motor controller 248 differentially.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used in this disclosure, an "aperture" is an opening in a surface. Aperture may be synonymous with hole, slit, crack, gap, slot, or opening.

As used in this disclosure, an "axle" is a cylindrical shaft that is inserted through the center of an object such that the center axis of the object and the center axis of the axle are aligned and the object can rotate using the axle as an axis of rotation.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used in this disclosure, a "caster" is a housing that includes a wheel. A caster may be mounted to the bottom of a device to enable movement of the device with reduced friction. In some embodiments, a caster may comprise a swivel that allows the wheel to adjust, or swivel, the direction of rotation of the wheel to the direction of motion desired for the wheel.

As used herein, the words "control" or "controls" are intended to include any device which can cause the completion or interruption of an electrical circuit; non-limiting examples of controls include toggle switches, rocker switches, push button switches, rotary switches, electromechanical relays, solid state relays, touch sensitive interfaces and combinations thereof whether they are normally open, normally closed, momentary contact, latching contact, single pole, multi-pole, single throw, or multi-throw.

As used herein, "conveyance" refers to a vehicle or method of transport or to the process of transporting something or someone from one place to another.

As used herein, the words "couple", "couples", "coupled" or "coupling", refer to connecting, either directly or indirectly, and does not necessarily imply a mechanical connection.

As used in this disclosure, "flexible" refers to an object or material which will deform when a force is applied to it, which will not return to its original shape when the deforming force is removed, and which may not retain the deformed shape caused by the deforming force.

As used herein, "front" indicates the side of an object that is closest to a forward direction of travel under normal use of the object or the side or part of an object that normally presents itself to view or that is normally used first. "Rear" or "back" refers to the side that is opposite the front.

As used in this disclosure, a "hinge" is a device that permits the turning, rotating, or pivoting of a first object relative to a second object.

As used in this disclosure, "horizontal" is a directional term that refers to a direction that is perpendicular to the local force of gravity. Unless specifically noted in this disclosure, the horizontal direction is always perpendicular to the vertical direction.

As used in this disclosure, the word "lateral" refers to the sides of an object or movement towards a side. Lateral directions are generally perpendicular to longitudinal directions. "Laterally" refers to movement in a lateral direction.

As used in this disclosure, a "lock" is a device that prevents the movement or operation of another device.

As used here, the word "midpoint" refers to a point that is between the ends of an object. An "exact midpoint" refers to a midpoint that is equidistant from edges of the object in at least one direction. Unless otherwise stated, a midpoint is not required to be at the exact center of the object but instead may be within 50% of the distance from the exact midpoint to the farthest edge or farthest corner.

As used in this disclosure, a "motor" refers to a device that transforms energy from an external power source into mechanical energy.

As used in this disclosure, "orientation" refers to the positioning and/or angular alignment of a first object relative to a second object or relative to a reference position or reference direction.

As used herein, the word "pivot" is intended to include any mechanical arrangement that allows for rotational motion. Non-limiting examples of pivots may include hinges, holes, posts, dowels, pins, points, rods, shafts, balls, and sockets, either individually or in combination.

As used in this disclosure a "pulley" is a wheel with a grooved rim around which a cord (or other form of rope, line, belt, or cable) passes. The pulley may be used to change the direction of a force applied to the cord. In some embodiments, pulleys may be used in groups of two or more to convey a force from one pulley to all other pulleys in the group via a belt.

As used herein, "starboard" refers to the right side of a vessel or vehicle when facing forward and "port" refers to the left side of the vessel or vehicle.

As used in this disclosure, "telescopic", "telescoping", and "telescopically" refer to an object made of sections that fit or slide into each other such that the object can be made longer or shorter by adjusting the relative positions of the sections.

As used in this disclosure, "vertical" refers to a direction that is parallel to the local force of gravity. Unless specifically noted in this disclosure, the vertical direction is always perpendicular to horizontal.

As used in this disclosure, a "wheel" is a circular object that revolves around an axle or an axis and is fixed below an object to enable it to move easily over the ground.

Throughout this document references to "wire", "wires", "wired", or "wiring" may describe and/or show a single conductor when, in fact, two conductors may be required to power or control a subsystem; a convention used herein is that the common return conductor to which all electrical subsystems are connected may not be shown in order to clarify the figures. This common return conductor is a continuous electrical path and does not pass through any type of switch or other electrical component other than the possibility of passing through one or more connectors.

With respect to the above description, it is to be realized that the optimum dimensional relationship for the various components of the invention described above and in FIGS. 1 through 4, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. An electric stroller comprising:
   a frame, a child seat, an operator seat, a plurality of wheels, a port motor, a starboard motor, a control circuit, and a battery;
   wherein the electric stroller is a self-propelled conveyance;
   wherein the child seat is supported by the frame and is adapted to transport a child;
   wherein the operator seat is coupled to the frame behind the child seat and is adapted to transport an operator;
   wherein a port driven wheel is propelled by the port motor;
   wherein a starboard driven wheel is propelled by the starboard motor;
   wherein the speed and direction of the port motor and the starboard motor are controlled independently;
   wherein the frame provides mechanical support for at least the child seat, the operator seat, the plurality of wheels, the port motor, the starboard motor, the control circuit, and the battery;
   wherein the frame comprises a port front leg, a port rear leg, a port upright, a starboard front leg, a starboard rear leg, a starboard upright, a child seat support, a plurality of crossbars, a handlebar, a cargo shelf, a port front wheel mount, a port rear wheel mount, a starboard front wheel mount, a starboard rear wheel mount, a port rear extension, a starboard rear extension, a port foot board, and a starboard foot board.

2. The electric stroller according to claim 1
   wherein the port side of the frame is vertically oriented and comprises the port front leg, the port rear leg, and the port upright;
   wherein the top of the port front leg is coupled to the top of the port rear leg and to a midpoint of the child seat support on the port of the child seat support;
   wherein the bottom of the port front leg is coupled to the port front wheel mount;
   wherein the bottom of the port rear leg is coupled to the front of the port rear extension;
   wherein the bottom of the port upright is coupled to a midpoint of the port rear leg;
   wherein the top of the port upright extends upwards and rearwards and is coupled to the port side of the handlebar;
   wherein the port upright extends forward horizontally and provides support for the port side of a seat bottom;

wherein the port rear extension is a horizontally oriented armature that extends rearwards from the port rear leg;

wherein the port rear wheel mount is located at the rear of the port rear extension.

3. The electric stroller according to claim 2 wherein the starboard side of the frame is vertically oriented and comprises the starboard front leg, the starboard rear leg, and the starboard upright;

wherein the top of the starboard front leg is coupled to the top of the starboard rear leg and to a midpoint of the child seat support on the starboard of the child seat support;

wherein the bottom of the starboard front leg is coupled to the starboard front wheel mount;

wherein the bottom of the starboard rear leg is coupled to the front of the starboard rear extension;

wherein the bottom of the starboard upright is coupled to a midpoint of the starboard rear leg;

wherein the top of the starboard upright extends upwards and rearwards and is coupled to the starboard side of the handlebar;

wherein the starboard upright extends forward horizontally and provides support for the starboard side of the seat bottom;

wherein the starboard rear extension is a horizontally oriented armature that extends rearwards from the starboard rear leg;

wherein the starboard rear wheel mount is located at the rear of the starboard rear extension.

4. The electric stroller according to claim 3 wherein the handlebar is an armature that is adapted to be grasped by the operator;

wherein the handlebar is coupled between the top of the port upright and the top of the starboard upright.

5. The electric stroller according to claim 4 wherein the child seat support is a U-shaped armature that supports the top of the seat bottom;

wherein the child seat support is horizontally oriented and extends forward from a midpoint of the port upright and a midpoint of the starboard upright.

6. The electric stroller according to claim 5 wherein the plurality of crossbars are horizontally oriented armatures that couple laterally between the port front leg and the starboard front leg, between the port rear leg and the starboard rear leg, between the port rear extension and the starboard rear extension, or combinations thereof;

wherein a seat base is coupled to the center of a seat support crossbar selected from the plurality of crossbars.

7. The electric stroller according to claim 6 wherein the handlebar comprises a port motor controller and a starboard motor controller;

wherein the port motor controller controls the rotational speed and direction of rotation of the port motor;

wherein the port motor controller is adapted to be twisted by the operator;

wherein the direction of the twist determines the direction of rotation of the port motor;

wherein the angular distance subtended by the twist determines the rotational speed of the port motor;

wherein the starboard motor controller controls the rotational speed and direction of rotation of the starboard motor;

wherein the starboard motor controller is adapted to be twisted by the operator;

wherein the direction of the twist determines the direction of rotation of the starboard motor;

wherein the angular distance subtended by the twist determines the rotational speed of the starboard motor.

8. The electric stroller according to claim 7 wherein the cargo shelf is a storage platform located under the child seat;

wherein the cargo shelf is a horizontally oriented planar surface that is coupled to the frame;

wherein the port foot board is a horizontally oriented surface adapted to support a left foot of the operator;

wherein the port foot board is coupled to the plurality of crossbars and to the port rear extension;

wherein the starboard foot board is a horizontally oriented surface adapted to support a right foot of the operator;

wherein the starboard foot board is coupled to the plurality of crossbars and to the starboard rear extension.

9. The electric stroller according to claim 8 wherein the child seat is adapted to be a seating area for the child;

wherein the child seat comprises the seat bottom, a seat back, a foot rest, and a sun shade;

wherein the seat bottom is a flexible panel that is suspended from the child seat support;

wherein the seat bottom comprises a horizontal surface adapted for the child to sit upon;

wherein the seat bottom comprises a pair of leg holes at the front of the child seat;

wherein the seat back is a flexible back support;

wherein the seat back is supported by the port upright and by the starboard upright;

wherein the foot rest is a ledge that descends at the front of the child seat;

wherein the foot rest is adapted to support the feet of the child;

wherein the sun shade is a flexible sun barrier that pivots forward to block exposure to the sun.

10. The electric stroller according to claim 9 wherein the operator seat is adapted to provide a seating area for the operator;

wherein the operator seat comprises the seat base, a seat hinge, a seat riser, and a saddle seat;

wherein the operator seat pivots forward for standing operation;

wherein the seat base is a vertically oriented armature that extends upwards from the seat support crossbar;

wherein the top of the seat base is coupled to the seat hinge;

wherein the seat hinge is a pivot point between the seat base and the seat riser;

wherein when a hinge release is unlocked, the seat riser pivots forward at the seat hinge;

wherein when the hinge release is locked, the seat riser is fixed in an upright orientation.

11. The electric stroller according to claim 10 wherein the hinge release is a removable pin.

12. The electric stroller according to claim 10 wherein the seat riser is a vertically oriented armature that couples to the seat hinge at the bottom of the seat riser and to the saddle seat at the top of the seat riser.

13. The electric stroller according to claim 12 wherein the height of the seat riser is adjustable;

wherein the seat riser is telescoping and is extended or retracted when a height lock is unlocked;

wherein when the height lock is locked, the height of the seat riser is fixed;

wherein the saddle seat is coupled to the top of the seat riser;

wherein the saddle seat is adapted for the operator to sit upon.

14. The electric stroller according to claim 13 wherein the plurality of wheels reduce friction between the electric stroller and the ground and propels the electric stroller;

wherein the plurality of wheels comprises a port front caster, the port driven wheel, a port rear caster, a starboard front caster, the starboard driven wheel, and a starboard rear caster.

15. The electric stroller according to claim 14 wherein the port front caster is pivotably coupled to the port front wheel mount;

wherein the starboard front caster is pivotably coupled to the starboard front wheel mount;

wherein the port rear caster is pivotably coupled to the port rear wheel mount;

wherein the starboard rear caster is pivotably coupled to the starboard rear wheel mount.

16. The electric stroller according to claim 15 wherein the port driven wheel is pivotably coupled to a port axle;

wherein the port axle is coupled to the port side of the frame at the bottom end of the port rear leg;

wherein a port wheel pulley is coupled to the inside of the port driven wheel;

wherein a port motor pulley is coupled to the shaft of the port motor;

wherein the port wheel pulley and the port motor pulley are aligned such that a port wheel belt loops around the port motor pulley and the port wheel pulley;

wherein rotation of the port motor pulley by the port motor drives the port wheel pulley and the port driven wheel;

wherein the starboard driven wheel is pivotably coupled to a starboard axle;

wherein the starboard axle is coupled to the starboard side of the frame at the bottom end of the starboard rear leg;

wherein a starboard wheel pulley is coupled to the inside of the starboard driven wheel;

wherein a starboard motor pulley is coupled to the shaft of the starboard motor;

wherein the starboard wheel pulley and the starboard motor pulley are aligned such that a starboard wheel belt loops around the starboard motor pulley and the starboard wheel pulley;

wherein rotation of the starboard motor pulley by the starboard motor drives the starboard wheel pulley and the starboard driven wheel.

17. The electric stroller according to claim 16 wherein the port motor converts electrical energy into mechanical energy;

wherein the port motor causes rotation of the port motor pulley when electrical energy is applied to the port motor;

wherein the electrical energy applied to the port motor is controlled by the control circuit;

wherein the starboard motor converts electrical energy into mechanical energy;

wherein the starboard motor causes rotation of the starboard motor pulley when electrical energy is applied to the starboard motor;

wherein the electrical energy applied to the starboard motor is controlled by the control circuit.

18. The electric stroller according to claim 17 wherein the control circuit controls the rotational direction and speed of the port motor and the starboard motor;

wherein the control circuit is electrically coupled to the port motor controller, the starboard motor controller, the port motor, the starboard motor, and the battery via wiring;

wherein the control circuit accepts electrical inputs from the port motor controller and from the starboard motor controller representing the positions of the port motor controller and the starboard motor controller;

wherein the control circuit sends electrical outputs to the port motor and to the starboard motor to establish a rotational speed and direction for each motor;

wherein the control circuit and the battery are housed in a controller compartment that is coupled to the underside of the cargo shelf.

19. The electric stroller according to claim 18 wherein the battery comprises one or more energy-storage devices;

wherein the battery is a source of electrical energy to operate the port motor and the starboard motor;

wherein the battery is replaceable or rechargeable.

* * * * *